(12) United States Patent
Schumacher et al.

(10) Patent No.: US 12,184,441 B2
(45) Date of Patent: Dec. 31, 2024

(54) METHOD AND DEVICE FOR OPERATING A DOMESTIC APPLIANCE AND SYSTEM HAVING A DOMESTIC APPLIANCE

(71) Applicant: BSH Hausgeräte GmbH, Munich (DE)

(72) Inventors: Frank Schumacher, Munich (DE); Sabine Harrer, Aying (DE); Tobias Schmidt, Munich (DE); Thomas Eric Beliveau, Munich (DE); Katja Schönfuss, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 51 days.

(21) Appl. No.: 17/442,153

(22) PCT Filed: Apr. 29, 2020

(86) PCT No.: PCT/EP2020/061900
§ 371 (c)(1),
(2) Date: Sep. 23, 2021

(87) PCT Pub. No.: WO2020/225054
PCT Pub. Date: Nov. 12, 2020

(65) Prior Publication Data
US 2022/0182255 A1    Jun. 9, 2022

(30) Foreign Application Priority Data
May 3, 2019   (DE) ............... 10 2019 206 337.3

(51) Int. Cl.
*H04L 12/28* (2006.01)
*A47L 15/42* (2006.01)
(Continued)

(52) U.S. Cl.
CPC ........ *H04L 12/282* (2013.01); *A47L 15/4293* (2013.01); *D06F 34/28* (2020.02);
(Continued)

(58) Field of Classification Search
CPC ............... H04L 12/282; H04L 12/2807; H04L 2012/285; A47L 15/4293; D06F 34/28;
(Continued)

(56) References Cited

U.S. PATENT DOCUMENTS

| | | | | |
|---|---|---|---|---|
| 7,754,025 | B1 * | 7/2010 | Crisp, III | B67D 1/0058 68/17 R |
| 9,753,687 | B1 * | 9/2017 | Cronin | G02B 27/017 |

(Continued)

FOREIGN PATENT DOCUMENTS

| | | |
|---|---|---|
| DE | 102008026481 A1 | 12/2009 |
| DE | 102010016473 A1 | 10/2011 |

(Continued)

OTHER PUBLICATIONS

National Search Report DE 10 2019 206 337.3 dated Nov. 27, 2019.
International Search Report PCT/EP2020/061900 dated Jul. 7, 2020.

*Primary Examiner* — Charles R Kasenge
(74) *Attorney, Agent, or Firm* — Michael E. Tschupp; Andre Pallapies; Brandon G. Braun

(57) ABSTRACT

In a method for operating a household appliance which includes a display device having a display element comprising an adjustable property and which includes a control apparatus for actuating the display device, an optical sensor of an external device detects an item of activation information from an object. A processing unit of the external device processes the detected activation information to generate an activation signal which is transmitted to the control apparatus for activating an adjustment of the property of the display element.

11 Claims, 2 Drawing Sheets

(51) Int. Cl.
*D06F 34/28* (2020.01)
*F24C 7/08* (2006.01)
*G06V 10/24* (2022.01)
*G06V 10/56* (2022.01)

(52) U.S. Cl.
CPC ............ *F24C 7/082* (2013.01); *G06V 10/245* (2022.01); *G06V 10/56* (2022.01); *H04L 12/2807* (2013.01); *H04L 2012/285* (2013.01)

(58) Field of Classification Search
CPC ... F24C 7/082; F24C 15/2021; G06V 10/245; G06V 10/56; F25D 29/00; F25D 2400/361; G08C 17/02; H04Q 9/00; G06F 3/048; H04M 2250/52
See application file for complete search history.

(56) References Cited

U.S. PATENT DOCUMENTS

| | | | | |
|---|---|---|---|---|
| 9,948,980 | B2* | 4/2018 | Glazier | H04N 21/4126 |
| 2012/0048926 | A1* | 3/2012 | Naito | G06K 7/1447 |
| | | | | 235/383 |
| 2012/0303323 | A1* | 11/2012 | Ha | D06F 34/32 |
| | | | | 702/183 |
| 2014/0118631 | A1* | 5/2014 | Cho | H04N 21/41265 |
| | | | | 348/836 |
| 2014/0223349 | A1* | 8/2014 | Shin | G06T 7/73 |
| | | | | 715/771 |
| 2015/0026615 | A1* | 1/2015 | Choi | G06F 3/0484 |
| | | | | 715/765 |
| 2018/0197034 | A1* | 7/2018 | Scott | G06F 3/0425 |
| 2020/0204727 | A1* | 6/2020 | Wang | G06V 20/00 |

FOREIGN PATENT DOCUMENTS

| | | |
|---|---|---|
| DE | 102012101537 A1 | 8/2013 |
| DE | 102013205760 A1 | 10/2014 |
| DE | 02016214477 A1 | 2/2018 |

* cited by examiner

METHOD AND DEVICE FOR OPERATING A DOMESTIC APPLIANCE AND SYSTEM HAVING A DOMESTIC APPLIANCE

CROSS-REFERENCES TO RELATED APPLICATIONS

This application is the U.S. National Stage of International Application No. PCT/EP2020/061900, filed Apr. 29, 2020, which designated the United States and has been published as International Publication No. WO 2020/225054A1 and which claims the priority of German Patent Application, Serial No. 10 2019 206 337.3, filed May 3, 2019, pursuant to 35 U.S.C. 119(a)-(d).

The contents of International Application No. PCT/EP2020/061900 and German Patent Application, Serial No. 10 2019 206 337.3 are incorporated herein by reference in their entireties as if fully set forth herein.

BACKGROUND OF THE INVENTION

The present invention relates to a method and a device for operating a household appliance and system having a household appliance.

Household appliances have for instance at least one display element with a predetermined property. The property can be a color, for instance, but can also be embodied as a shape and/or a symbol. The display element can be a display or part of a display of a household appliance, in which a temperature can be displayed. Moreover, household appliances comprise different physical objects, such as handles, lisenes, twist pads, frames and/or decorative elements, for instance, which are embodied in a specific color, from a specific material and/or as a specific shape, and which can likewise have at least one display element.

BRIEF SUMMARY OF THE INVENTION

Against this background, an object of the present invention consists of improving the operation of a household appliance.

According to a first aspect, a method is proposed for operating a household appliance with a display device with at least one display element comprising at least one adjustable property and with a control apparatus for controlling the display device. The method comprises the steps:

Detecting an item of activation information from an object by means of an optical sensor of an external device, Processing the detected activation information by means of a processing unit of the external device for generating an activation signal, and Transmitting the generated activation signal to the control apparatus for activating an adjustment of the at least one property of the display element.

The present method advantageously enables an initial adjustment of a desired property of at least one display element by means of the generated activation signal. In this way, a user can, at his own request, adjust at least the one property of the display element and thus customize his household appliance. As a result, the operability of the household appliance and the convenience for the user increase. By means of the adjustable property it is possible for the property or properties of the at least one display element of the household appliance to be optimally adapted to the property of a respective physical object of the household appliance, such as, for instance, a handle, a lisene, a twist pad, a frame and/or a decorative element.

The household appliance is embodied as a cooking appliance, for instance, such as an oven, a hob, a cooker, a steam cooker, a steam oven and/or a microwave, for instance. Furthermore, the household appliance can be embodied as a refrigeration appliance, such as, for instance, as a refrigerator and/or freezer. Furthermore, the household appliance is embodied, for instance, as a coffee machine, as a washing machine, as a washer-dryer, as an extractor hood and/or as a dishwasher.

The display device is in particular a technical apparatus which is designed to display information. A display device of this type can comprise one or more display elements.

The display element is preferably embodied as a TFT display (Thin Film Transistor Display), LCD (Liquid Crystal Display), an LED display (Light Emitting Diode), an OLED display (Organic LED), a fluorescence display and/or a segment display. The display element is advantageously self-illuminating and/or comprises a background illumination in order to enable the displays to be readable even with unfavorable lighting conditions. It can however also be operated without a background illumination. The display element has at least one subcomponent, wherein the subcomponents included in the display element can be actuated in each case individually. Subcomponents of this type can be referred to as pixels.

A pixel can assume precisely one state at one point in time. With a display element which is designed to display colors, a state is specified as a color, for instance. If the display element comprises a background illumination and/or is self-illuminating, the state can additionally comprise a brightness value. The state can be shown clearly as a vector in a three-dimensional color space, for instance, such as an RGB color space (red-green-blue). A display element advantageously comprises a large number of pixels, wherein the individual pixels have very small dimensions, the pixels are particularly advantageously so small that they are not perceived as individual pixels by a user. One such display element is suited to displaying a complex, graphical display. Furthermore, ambient light of a household appliance, such as for instance an LED illumination, can also be color-matched in a hood of the household appliance or in a platform of a coffee machine.

The control apparatus is in particular designed to control the display device by means of a control command. The control apparatus can also control one or more display elements of the household appliance directly by means of a control command.

The control apparatus is preferably also designed to receive and process the activation signal and thereupon to carry out an adjustment of the at least one property of the display element as a function of the received and processed activation signal. In addition, the control apparatus of the household appliance is designed in particular to actuate or control various functions of the household appliance, such as, for instance, rinsing, washing, heating, cleaning and/or drying.

An object is in particular a physical object, such as a handle, a lisene, a twist pad, a frame and/or a decorative element of a household appliance or for a household appliance. The physical object can also be an accessory part for the household appliance, which is attached on or in the household appliance and which is specific to the respective household appliance. Accessory parts comprise parts which may have been acquired as an accessory part for a household appliance, such as, for instance, a wine glass holder, a cutlery basket and/or a baking tray.

The activation information comprises in particular information which specifies that the at least one property for adjusting the display element is activated, in other words the permission to adjust the property of the display element of the household appliance.

The activation signal is preferably generated using the activation information. The generated activation signal comprises in particular adjustment information, which has information which specifies which property or properties are selected to adjust the display element and how the property or the properties are embodied. The adjustment information is fixed for instance by the user independently using the processing unit or is automatically fixed by means of the processing unit as a function of the detected activation information.

The activation signal is embodied in particular as a radio signal, which is transmitted from the external device to the control apparatus. The radio signal is a character or a string of characters emitted by radio waves for the wireless transmission of messages.

The processing unit is installed in particular on the external device and/or is designed to operate on the external device.

The external device with the optical sensor is held or arranged by the user in particular so that the optical sensor can detect the activation information. This is fulfilled, for instance, when a line of sight is present from the activation information to the optical sensor.

According to one embodiment, a camera is used as the optical sensor to detect the activation information, wherein the activation information is arranged on the object or on a packaging of the object.

The object is, as explained above, in particular a physical object, such as a handle, for instance. Here the handle itself can comprise the activation information so that this can be detected with the camera. The handle can also be accommodated in a packaging, in other words be packaged. The activation information can also be arranged in the packaging on an element, which is embodied externally to the handle. The activation information is preferably attached to the packaging.

The optical sensor is in particular embodied as an optoelectronic sensor. The optical sensor comprises a camera, in particular a digital camera, for instance with a CCD sensor (Charged Coupled Device). The camera detects for instance an image of the activation information. An external camera can also be coupled to the external device, in order to detect the activation information by means of the external camera. The external device comprises in particular the camera.

The activation information can also be detected by the at least one optical sensor of the augmented reality glasses by means of augmented reality glasses used by the user.

According to a further embodiment, the adjustable property of the display element comprises an adjustment of at least one color tone, at least one color saturation and/or at least one brightness of a color and/or the adjustment of a theme world with a preselected color and/or the adjustment of at least one symbol, which is shown in the display element.

By means of the adjustable property which is activated by means of the activation signal, it is possible to adapt the color of one or more display elements to the color and/or the design of the at least one physical object of the household appliance and to optically match the same optimally to one another.

As a result, the color of a display element of the household appliance can advantageously be adjusted to the color and/or a materiality of the object and/or the accessory part and/or to the color of the display element of the object and/or of the accessory part by activating the adjustment of the color of the display element, which corresponds to an adjustment of the property of the display element. The color of the display element of the household appliance can also be adapted to a number of accessory parts or objects of the household appliance. The accessory part and/or the object has been acquired in particular at the same time as the household appliance was acquired. The accessory part and/or the object can also be purchased subsequently. Moreover, the objects can themselves have at least one display element, in which an adjustment of a property can likewise be performed, so that the display element of the object matches the display element of the household appliance.

The adjustment information which is contained in particular in the generated activation signal can be used by the user to specify, preferably by way of the processing unit, which property or properties are selected to adjust the display element, such as, for instance, a color and how the property or the properties are embodied, in other words for instance which color saturation or which brightness the color has. This adjustment information is transferred to the control apparatus in particular by means of the activation signal. The color of the display element of the household appliance and/or of the object can therefore be shown as a function of the adjustment information.

For instance, the display element of the household appliance is embodied in a or as part of a theme world. A theme world is understood here to mean a theme world which has a predetermined color. In particular, the theme world of a display of a household appliance with a predetermined color has a property, such as a color ambient. The color ambient of a theme world with a predetermined color or of a display element comprises in particular a predetermined color tone, a predetermined color saturation and/or a predetermined brightness of the color. An activation of the adjustment of the color ambient is enabled by the present invention. Here a number of different color ambients for adjusting the theme world of the display are activated by detecting the activation information, for instance. For instance, the theme world can comprise a blue, green, orange and/or copper-colored color ambient. The color ambient of the theme world is fixed in particular as a function of the color and/or the materiality of the accessory part and/or the object.

The theme world which is shown on the display or the display element of the household appliance can comprise various sections. Here the sections included in the theme world can preferably be individually controllable in each case. Sections of this type can be embodied as pixels. The pixels of the various sections can preferably be embodied differently, this means that at least two pixels have different color brightnesses of a color.

In addition, the theme world can comprise one or more symbols, which display for instance the heating type or the heating temperature of a household appliance, such as an oven. The symbol shown by the theme world or the display element can comprise different geometric shapes, such as for instance rectangular or square shapes. Furthermore, the theme world can be used to display a program adjustment and/or a recipe which can be adjusted in a specific color ambient by activation by means of the activation signal.

According to a further embodiment, the generated activation signal is used to initially activate or repeatedly activate the adjustment or to adjust the at least one property of the display element.

An initial activation of the at least one property of the display element is understood here in particular to mean that the adjustment of the at least one property of the display element is firstly activated as a function of the generated activation signal. The possibility of adjusting the at least one property of the display element is therefore initially given.

There is in particular also repeated activation of the adjustment. This is the case when a subscription has been acquired for instance by adjusting a property, in particular by way of a plurality of different properties of the display element. After the end and thus the course of the subscription, the adjustment of each property is no longer available. With a renewal of or re-entry into the subscription, the repeated activation of the adjustment is in particular carried out.

A (renewed) adjustment of the property can preferably be performed at any time after the initial activation by the user by means of the external device and/or on the household appliance itself by the user. With this renewed adjustment and/or change in the property of the display element, another color tone is selected for the display element, for instance.

According to a further embodiment, the generated activation signal has a specific validity, wherein the specific validity comprises an unlimited validity or a limited validity.

A limited validity is in particular understood to mean a limited validity in terms of time. This is then the case if a subscription with a time-limited validity has been concluded for adjusting the property, for instance. However, it is possible for the user to regularly obtain new updates and editions for the property of the display element by means of the subscription. Editions are in particular also independent of a subscription, such as for instance regionally or seasonally.

An unlimited validity is in particular understood to mean in particular validity which is unlimited in terms of time. This is then the case when the object, the accessory part and/or the packaging, which has the activation information, has then been acquired by the user.

The specific validity of the generated activation signal is checked in particular by means of an Internet connection from the external device to a manufacturer's server. Here the specific validity of the generated activation signal is inspected by means of the manufacturer's server. The inspection of the specific validity comprises for instance a check to determine whether the activation information is or has already been used by another user.

According to a further embodiment, the transmission of the generated activation signal to the control apparatus is carried out in step c) by means of a communication interface of the household appliance.

According to a further embodiment, the communication interface comprises a radio module, which is coupled with the control apparatus for transmitting data between the household appliance and the external device.

The radio module is in particular a Wi-Fi radio module, which can be used as a Wi-Fi client or as a Wi-Fi access point. The radio module of the present household appliance is designed in particular to transmit radio signals with the external device. The radio module further preferably comprises a transmit and receive unit for transmitting data between the household appliance and the external device. The generated activation signal is transmitted in particular as a radio signal from the external device via the coupled radio module to the control apparatus.

The radio module is preferably designed to bidirectionally exchange radio signals between the external device and the household appliance. The radio module can consequently send radio signals to the external device and also receive radio signals from the external device.

According to a further embodiment, the communication interface comprises a network module, which is coupled to the control apparatus, wherein the activation signal is transmitted to a server by means of the external device and the household appliance receives the activation signal from the server by means of the network module.

Here the generated activation signal is transmitted in particular as a radio signal from the external device to a network device. The server is in particular assigned to the manufacturer of the household appliance.

During the transmission of the generated activation signal by means of a wireless local network (WLAN), or via Bluetooth from the external device to the network device, the network device is embodied as a router, for instance.

The transmission of the generated activation signal can be transmitted in particular in the form of a radio signal directly via a mobile radio network to the server. The router, in other words the network device, is preferably connected to the server.

The network module of the household appliance is particular connected to the network device, in other words the router, an intranet or internet and/or to the server of the manufacturer and/or a further server. For instance, data can be loaded onto the household appliance by way of the server and the external device. The connection of the network module to the router, the intranet or internet and/or the server of the manufacturer is preferably embodied to be wired, such as by means of copper conductors, optical conductors, a powerline infrastructure, and/or wireless and/or as a further wireless or wired data network.

According to a further embodiment, the external device comprises a mobile terminal of a user, wherein the processing of the detected activation information and the adjustment of the at least one property by the user are carried out by means of the processing unit running on the mobile terminal and embodied as an application.

The external device is in particular a mobile terminal. The mobile terminal is for instance a smartphone, a mobile telephone, a tablet or a tablet computer. The mobile terminal comprises at least one camera, which is used as the optical sensor. Here the user himself can carry out the recording in order to detect the activation information. The external device is designed in particular to operate the household appliance.

The processing unit is embodied in particular as an application (App). The application on the mobile terminal comprises in particular graphical representations. The user can activate and adjust the at least one property of the display element using the application. For instance, the detected activation information can be processed by means of the processing unit. Processing is understood here to mean in particular that the detected activation information is transmitted to a server and after checking the server and permitting the detected activation information this is used to generate the activation signal. In particular, the generated and permissible activation signal is then further transmitted and processed. The processing unit is in particular designed to process the detected activation information and to generate an activation signal as a function thereof.

In particular, a preview into the further adjustment of the property of the display element of the household appliance can be shown by way of the application. This has the advantage that the adjustment of the property of the display element can be visualized to the user before purchasing the desired household appliance and/or object. On the basis of the visualization, the user can make his purchase decision in respect of the household appliance and/or the object. The adjustment of the property of the display element from the preview can then be transmitted to the household appliance after purchasing the household appliance and/or the object. Various properties for adjusting the display element are therefore already available when the household appliance is purchased.

According to a further embodiment, the activation information comprises a two-dimensional code, in particular a Quick Response code (QR code).

The QR code is in particular arranged on the object or the packaging of the object. The object may have been acquired for instance at a later point in time, compared with the time of purchase of the household appliance.

The processing unit comprises in particular the processing of the detected activation information. The processing of the detected activation information preferably comprises a recording of the QR code by the camera by means of the user, decoding the QR code by the processing unit and generating the activation signal by the processing unit.

According to a further embodiment, the activation information comprises a barcode as a two-dimensional code.

According to a further embodiment, the camera is used as the optical sensor for detecting the object, wherein the object is identified by means of object recognition and the activation signal is generated as a function of the detected and identified object.

According to a further embodiment, the adjustable property can be reset by the user. The resetting by the user is carried out in particular by means of the processing unit or on the household appliance itself by an input and/or setting of the user.

According to a second aspect, a computer program product is proposed, which triggers the implementation of the method explained above on a program-controlled device.

A computer program product, such as e.g. a computer program means, can be provided or supplied for instance as a storage medium, such as e.g. memory card, USB stick, CD-ROM, DVD or also in the form of a downloadable file from a server in a network. This can take place for instance in a wireless communication network by transmitting a corresponding file with the computer program product or the computer program means.

According to a third aspect, a device is proposed for operating a household appliance, which has a display device with at least one display element comprising at least one adjustable property and a control apparatus for actuating the display device. Here the device is external to the household appliance and comprises:

A detection unit for detecting activation information from an object by means of an optical sensor of the external device, A processing unit for processing the detected activation information and for generating an activation signal, and A transmission unit for transmitting the generated activation signal to the control apparatus for activating an adjustment of the at least one property of the display element.

The respective unit, such as the detection unit or the processing unit, and/or the control apparatus can be implemented using hardware and/or also software. With an implementation using hardware, the respective unit and/or the control apparatus can be embodied for instance as a computer or as a microprocessor. With an implementation using software, the respective unit and/or the control apparatus can be embodied as a computer program product, as a function, as a routine, as part of a program code or as an executable object.

According to a fourth aspect, a system is proposed with a household appliance and a device external to the household appliance according to the third aspect.

According to one development, the system comprises a plurality H of household appliances with H≥2. Here the respective control apparatus of the respective household appliance of the plurality is designed to adjust the at least one property of the display element of the plurality of household appliances by means of the transmitted activation signal so that the adjusted properties of the display elements are identical.

In particular, a plurality H of household appliances, with H≥2, is arranged in a kitchen. Each of the household appliances from the plurality H comprises in each case at least one display element, to which a property is adjusted.

Here it is advantageously possible to adjust all selected display elements of the household appliances in a color for instance by means of the activation signal. In this regard, all selected display elements of the household appliances in particular then light up in precisely the color in which all handles and/or all frames of all household appliances are embodied, for instance. A uniform adjustment of the display elements of the household appliances of the kitchen to the physical objects of the kitchen is carried out by adjusting the property of the display element. As a result, the physical objects and the display elements of the household appliance of the kitchen are optically matched optimally to one another.

The embodiments and features described for the proposed method apply to the proposed apparatus accordingly.

Further possible implementations of the invention also comprise not explicitly cited combinations of features or embodiments described above or below in respect of the exemplary embodiments. Here the person skilled in the art will also add individual aspects as improvements or additions to the respective basic form of the invention.

BRIEF DESCRIPTION OF THE DRAWINGS

Further advantageous embodiments and aspects of the invention form the subject matter of the subclaims and the exemplary embodiments of the invention described below. Furthermore, the invention is explained in more detail below on the basis of preferred embodiments with reference to the appended figures.

DETAILED DESCRIPTION OF EXEMPLARY EMBODIMENTS OF THE PRESENT INVENTION

Figure 1:
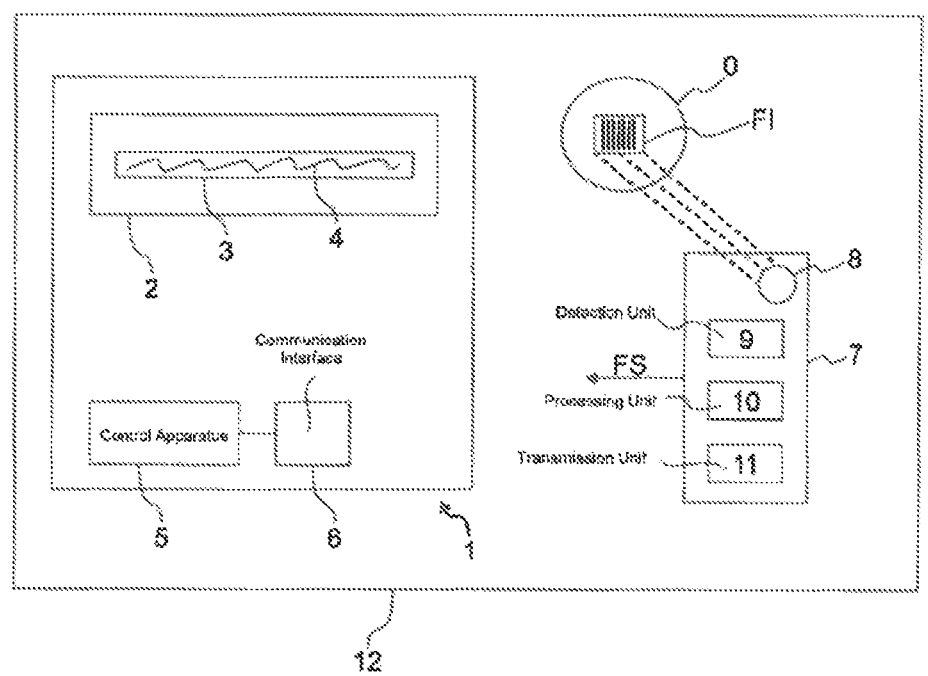
FIG. 1 shows a schematic view of an exemplary embodiment of a device for operating a household appliance and a household appliance.

In the figures, identical or functionally identical elements have been provided with the same reference characters unless specified otherwise.

FIG. 1 shows a schematic view of an exemplary embodiment of a device 7 for operating a household appliance 1 and a household appliance 1.

The household appliance 1 in FIG. 1 comprises a display device 2 with at least one display element 3, which has at least one adjustable property 4. Furthermore, the household appliance 1 comprises a control apparatus 5 for actuating the display device 2. In FIG. 1 the device 7 is arranged externally to the household appliance 1. The external device 7 has a detection unit 9, a processing unit 10 and a transmission unit 11.

The detection unit 9 is designed to detect an item of activation information FI from an object O by means of an optical sensor 8 of the external device 7.

Furthermore, the processing unit 10 is designed to process the detected activation information FI and to generate an activation signal FS as a function thereof.

The transmission unit 11 is designed to transmit the generated activation signal FS to the control apparatus 5 in order to activate an adjustment of the at least one property 4 of the display element 2.

In FIG. 1 the household appliance 1 and the device 7 for operating the household appliance 1, which is external to the household appliance 1, form a system 12.

In addition, the system 12 can comprise a plurality H of household appliances 1 (not shown). Here the respective control apparatus 5 of the respective household appliance 1 of the plurality of household appliances 1 is designed to adjust the at least one property 4 of the display element 3 of the plurality of household appliances 1 by means of the transmitted activation signal FS. The at least one property 4 of the display element 3 of the plurality of household appliances 1 is adjusted so that the adjusted properties 4 of the display elements 3 are identical.

Figure 2:
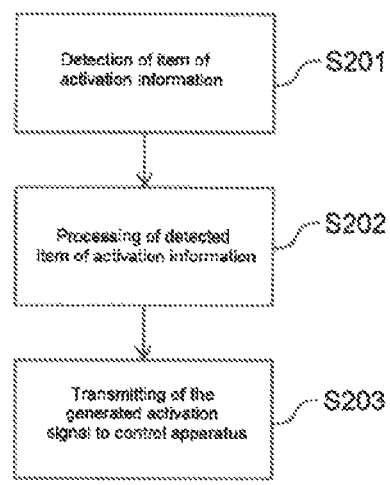
FIG. 2 shows a schematic block diagram of an exemplary embodiment of a method for operating a household appliance.

FIG. 2 shows a schematic block diagram of an exemplary embodiment of a method for operating a household appliance 1, such as, for instance, the household appliance 1 in FIG. 1. The household appliance 1 comprises a display device 2 with at least one display element 3, which has at least one adjustable property 4. Furthermore, the household appliance 1 comprises a control apparatus 5 for actuating the display device 2.

The method in FIG. 2 has the steps S201, S202 and S203.

In step S201, an item of activation information FI is detected from an object O by means of an optical sensor 8 of an external device 7. Here a camera is used as the optical sensor 8, for instance. Furthermore, the item of activation information FI is arranged on the object O or on a packaging of the object O. Furthermore, the item of activation information FI comprises a two-dimensional code, in particular a Quick Response code.

In addition, the object O can be identified by means of object recognition and the activation signal FS can be generated as a function of the detected and identified object O.

In step S202, the detected item of activation information FI is processed by means of a processing unit 10 of the external device 7 and as a function of this an activation signal FS is generated.

The generated activation signal FS is used here to initially activate or repeatedly activate the adjustment or to adjust the at least one property 4 of the display element 3. In addition, the generated activation signal FS has a specific validity. The specific validity comprises an unlimited validity or a limited validity.

In step S203, the generated activation signal FS is transmitted to the control apparatus 5 to activate an adjustment of the at least one property 4 of the display element 3. Here the adjustable property 4 of the display element 3 comprises an adjustment of at least one color tone, a color saturation or a brightness of a color. Furthermore, the adjustable property 4 of the display element 3 has an adjustment of a theme world which is predetermined in terms of color or the adjustment of at least one symbol, which is shown in the display element 3.

The transmission of the generated activation signal FS in step S203 to the control apparatus 5 is carried out by means of a communication interface 6 of the household appliance 1. The communication interface 6 comprises in particular a radio module and/or a network module.

The radio module can be coupled to the control apparatus 5 for transmitting data between the household appliance 1 and the external device 7.

The network module can likewise be coupled to the control apparatus 5. In this case, the activation signal FS is transmitted by means of the external device 7 to a server. The household appliance 1 then receives the activation signal FS by means of the network module from the server.

Furthermore, the external device 7 comprises a mobile terminal of a user. The processing unit 10 embodied as an application runs in particular on the mobile terminal of the user. Here the processing of the detected activation information FI and the adjustment of the at least one property 4 by the user is carried out by means of the processing unit 10.

Although the present invention has been described on the basis of exemplary embodiments, it can be modified in a variety of ways.

REFERENCE CHARACTERS USED 1 household appliance
2 display device
3 display element
4 (adjustable) property
5 control apparatus
6 communication interface
7 external device
8 optical sensor (camera)
9 detection unit
10 processing unit
11 transmission unit
12 system
FI activation information
FS activation signal
object
S201 method step
S202 method step
S203 method step

The invention claimed is:

1. A method for operating a household appliance, the household appliance including a display device having a display theme configured to control an appearance of elements displayed by the display device and a control apparatus configured to control the display device, the method comprising the steps of:
  a) detecting an item of activation information from a physical accessory of the household appliance using an optical sensor of an external device;
  b) processing the detected activation information to generate an activation signal using a processing unit of the external device; and
  c) transmitting the generated activation signal to the control apparatus via a communication interface of the household appliance to activate an adjustment of the display theme, such that the appearance of subsequent elements displayed by the display device of the household appliance is controlled by the adjusted display theme;

wherein the household appliance is selected from the group consisting of a cooking appliance, a refrigeration appliance, a washing appliance, a drying appliance, and a dishwasher, and the communication interface comprises a radio module, which is coupled to the control apparatus for transmitting data between the household appliance and the external device.

2. The method of claim 1, wherein the optical sensor is a camera, and the method further comprises arranging the activation information on the physical accessory or on a packaging of the physical accessory.

3. The method of claim 1, wherein the display theme includes one or more elements selected from the group consisting of a color tone, a color saturation, a brightness, a color scheme, and one or more symbols displayed by the display device of the household appliance.

4. The method of claim 1, wherein the generated activation signal is used to initially activate or repeatedly activate the adjustment of the display theme.

5. The method of claim 1, wherein the generated activation signal includes a specific validity which comprises an unlimited validity or a limited validity.

6. The method of claim 1, wherein the activation information comprises a two-dimensional code.

7. The method of claim 1, wherein the activation information comprises a Quick Response code.

8. The method of claim 1, wherein the optical sensor is a camera, and the method further comprising:
    identifying the physical accessory by object recognition; and
    generating the activation signal as a function of the detected and identified physical accessory.

9. A computer program product for operating a household appliance, comprising a non-transitory computer readable medium having a computer program stored therein, wherein the computer program, when loaded into a program-controlled device and executed by the program-controlled device, causes the program-controlled device to perform the method as set forth in claim 1.

10. A method for operating a household appliance, the household appliance including a display device having a display theme configured to control an appearance of elements displayed by the display device and a control apparatus configured to control the display device, the method comprising the steps of:
    a) detecting an item of activation information from a physical accessory of the household appliance using an optical sensor of an external device;
    b) processing the detected activation information to generate an activation signal using a processing unit of the external device; and
    c) transmitting the generated activation signal to the control apparatus via a communication interface of the household appliance to activate an adjustment of the display theme, such that the appearance of subsequent elements displayed by the display device of the household appliance is controlled by the adjusted display theme;
    wherein the household appliance is selected from the group consisting of a cooking appliance, a refrigeration appliance, a washing appliance, a drying appliance, and a dishwasher and,
    the communication interface comprises a network module coupled to the control apparatus, and the method further comprising:
    transmitting by the external device the activation signal to a server; and
    receiving the activation signal at the household appliance from the server via the network module.

11. A method for operating a household appliance, the household appliance including a display device having a display theme configured to control an appearance of elements displayed by the display device and a control apparatus configured to control the display device, the method comprising the steps of:
    a) detecting an item of activation information from a physical accessory of the household appliance using an optical sensor of an external device;
    b) processing the detected activation information to generate an activation signal using a processing unit of the external device; and
    c) transmitting the generated activation signal to the control apparatus to activate an adjustment of the display theme, such that the appearance of subsequent elements displayed by the display device of the household appliance is controlled by the adjusted display theme;
    wherein the household appliance is selected from the group consisting of a cooking appliance, a refrigeration appliance, a washing appliance, a drying appliance, and a dishwasher, and
    the external device comprises a mobile terminal of a user, wherein the processing of the detected item of activation information and the adjustment of the property are carried out by the user via the processing unit running on the mobile terminal and embodied as an application.

* * * * *